(12) United States Patent
Yukihara et al.

(10) Patent No.: US 7,603,881 B2
(45) Date of Patent: Oct. 20, 2009

(54) GLOVE BOX DEVICE

(75) Inventors: Jin Yukihara, Miyazaki (JP); Takuya Miyagawa, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 268 days.

(21) Appl. No.: 11/546,823

(22) Filed: Oct. 12, 2006

(65) Prior Publication Data

US 2007/0114809 A1 May 24, 2007

(30) Foreign Application Priority Data

Nov. 24, 2005 (JP) .............................. 2005-338904

(51) Int. Cl.
*B60R 25/02* (2006.01)
(52) U.S. Cl. .................. 70/208; 292/216; 292/DIG. 30
(58) Field of Classification Search .................. 70/208; 292/216, DIG. 30, DIG. 31, DIG. 42, DIG. 43
See application file for complete search history.

(56) References Cited

U.S. PATENT DOCUMENTS

| | | | | |
|---|---|---|---|---|
| 3,283,549 A | * | 11/1966 | Mees | 70/467 |
| 4,438,964 A | * | 3/1984 | Peters | 292/216 |
| 4,534,193 A | * | 8/1985 | Takemura et al. | 70/218 |
| 4,683,736 A | * | 8/1987 | Weinerman et al. | 70/208 |
| 4,904,004 A | * | 2/1990 | Bartczak | 292/216 |
| 5,263,346 A | * | 11/1993 | Sato et al. | 70/210 |
| 5,484,178 A | * | 1/1996 | Sandhu et al. | 292/173 |
| 5,630,630 A | * | 5/1997 | Price et al. | 292/128 |
| 5,820,175 A | * | 10/1998 | Clavin | 292/165 |
| 5,852,943 A | * | 12/1998 | Dutka et al. | 70/237 |
| 5,927,772 A | * | 7/1999 | Antonucci et al. | 292/336.3 |
| 6,048,006 A | * | 4/2000 | Antonucci et al. | 292/336.3 |
| 6,708,537 B1 | * | 3/2004 | Eschweiler et al. | 70/208 |
| 6,722,718 B2 | * | 4/2004 | Brown et al. | 296/37.12 |
| 6,742,818 B2 | * | 6/2004 | Seki et al. | 292/216 |
| 7,065,992 B2 | * | 6/2006 | Talukdar et al. | 70/208 |
| 7,380,855 B2 | * | 6/2008 | Ishiguro et al. | 296/37.1 |
| 7,383,707 B2 | * | 6/2008 | Yamada et al. | 70/208 |
| 2002/0171248 A1 | * | 11/2002 | Diss et al. | 292/164 |
| 2007/0200361 A1 | * | 8/2007 | Najima | 292/216 |

FOREIGN PATENT DOCUMENTS

| | | |
|---|---|---|
| DE | 35 14 605 | 5/1985 |
| DE | 198 31 727 A 1 | 1/2000 |
| EP | 0976900 | 2/2000 |
| JP | 2004-076449 | 3/2004 |

* cited by examiner

*Primary Examiner*—Suzanne D Barrett
(74) *Attorney, Agent, or Firm*—Carrier, Blackman & Associates, P.C.; William D. Blackman; Joseph P. Carrier

(57) ABSTRACT

In a glove box device, a cylinder is fixed to an operating handle, a slide member switches between a locking state and an unlocking state in correspondence to sliding motion, and a connecting member is interposed between one end of the slide member and a rotor. The connecting member transmits a turning force of the rotor turning along with the operating handle to the slide member, to move the slide member from a locking position to an unlocking position when the rotor is in the unlocking position. The connecting member cuts off the transmission of turning force between the slide member in the locking position and the rotor, when the rotor is in the locking position. Thus, it is possible to reduce the number of components needed, and also to reduce a gap between a design face of the operating handle and the cylinder lock, thereby improving the appearance.

5 Claims, 7 Drawing Sheets

GLOVE BOX DEVICE

CROSS-REFERENCE TO RELATED APPLICATION

The present invention claims priority under 35 USC 119 based on Japanese patent application No. 2005-338904, filed on Nov. 24, 2005. The subject matter of this priority document is incorporated by reference herein.

BACKGROUND OF THE INVENTION

1. Field of the Invention

The present invention relates to a glove box device, and particularly to an improvement of a glove box device including a cylinder lock for switching over a locked state and an unlocked state of a lid.

2. Description of the Related Art

Japanese Patent Application Laid-open No. 2004-76449 discloses a glove box device wherein an operating handle capable of turning in a horizontal direction is supported on a base member mounted to a lid covering an opening of a box body, and a transmission mechanism is operated by locking and unlocking operations of a cylinder lock mounted on a stationary portion separate from the operating handle, whereby transmission and cutting-off of the transmission of an operational force of the operating handle are switched over in response to the operated state of the transmission mechanism.

However, in the glove box device disclosed in the Japanese Patent Application Laid-open No. 2004-76449, the transmission mechanism comprises a large number of components and also the structure is complicated, resulting in that the cost is liable to increase. Further, the operation is delayed in transmitting the operational force of the operating handle due to the large number of components, whereby an operational load is quickly built up. Thus, it cannot be said that the operational feeling is excellent.

In addition, because the cylinder lock is mounted on the stationary portion separate from the operating handle, if a tip end of the cylinder lock is arranged to face a design face of the operating handle in its closing position, a misalignment is liable to be generated between the design face of the operating handle and the tip end of the cylinder lock. Moreover, because it is required to provide a large opening in the design face in order to avoid the interference during operation of the operating handle, a gap is liable to be conspicuous. Therefore, in the conventional device, it is necessary to contrive a measure for improving the dimensional accuracy of each part so that the gap is inconspicuous to the utmost.

SUMMARY OF THE INVENTION

Accordingly, it is an object of the present invention to provide a glove box device, wherein the number of components is reduced to simplify the structure thereby reducing the cost and improving the operational feeling, and moreover a gap between a design face of an operating handle and a cylinder lock is reduced thereby improving the appearance.

In order to achieve the above object, according to a first feature of the present invention, there is provided a glove box device comprising: a base member mounted to a lid capable of opening and closing an opening of a box body; an operating handle turnably supported on the base member; a cylinder lock including a cylinder fixed to the operating handle, and a rotor turnably inserted into the cylinder so that the rotor can turn between a locking position and an unlocking position; a locking mechanism which has a slide member capable of sliding between an locking operation position and an unlocking operation position, and which switches over a locked state in which a closed state of the lid is maintained and an unlocked state in which opening of the lid is permitted, in correspondence to sliding motion of the slide member; and a connecting member interposed between the rotor and the slide member; the connecting member transmitting a turning force of the rotor turning along with the operating handle to the slide member so as to cause the slide member to slide from the locking operation position to the unlocking operation position upon turning operation of the operating handle to an opening side, when the rotor is in the unlocking position; but the connecting member cutting off the transmission of the turning force between the slide member in the locking operation position and the rotor, when the rotor is in the locking position.

With the first feature, the cylinder of the cylinder lock is fixed to the operating handle, and hence the gap between the design face of the operating handle and the cylinder lock is reduced to improve the appearance. Moreover, when the rotor of the cylinder lock is in the unlocking state, the turning force of the rotor of the cylinder lock turning along with the operating handle is transmitted through the connecting member to the slide member, thereby bringing the locking mechanism into the unlocking state; and when the rotor is in the locking position, the turning force of the rotor of the cylinder lock turning along with the operating handle is not transmitted through the connecting member to the slide member. Therefore, only the connecting member serves as a component for transmitting the turning operation force of the operating handle to the slide member, thereby decreasing the number of the components and simplifying the structure, leading to the cost reduction. Further, no operational delay is generated in transmitting the operational force of the operating handle to the locking mechanism, thereby improving the operational feeling.

According to a second feature of the present invention, in addition to the first feature, a return spring is mounted between the slide member and the base member so as to bias the slide member toward the locking operation position located on its lengthwise one end side; the connecting member is supported on the base member so as to turn about an axis same as that of turning of the operating handle with one end of the connecting member facing an outer surface of the rotor, the other end thereof facing one end of the slide member in such a manner that it is sandwiched between a restricting portion provided on the base member and one end of the slide member when the slide member is in the locking operation position; and a driving abutment face and an abutment avoiding recess are provided on an outer surface of the rotor, the driving abutment face abutting against the one end of the connecting member when the rotor is in the unlocking position, the abutment avoiding recess being designed to avoid abutment against the one end of the connecting member when the rotor is in the locking position.

With the second feature, in a simple structure in which the driving abutment face and the abutment avoiding recess are provided on the outer surface of the rotor, the driving abutment face abutting against the one end of the connecting member when the rotor is in the unlocking position, the abutment avoiding recess being designed to avoid abutment against the one end of the connecting member when the rotor is in the locking position, the transmission and the cutting-off of the transmission of the turning force of the operating handle to the slide member is switched over in response to the unlocking and locking operations of the cylinder lock. Moreover, in the closed state of the lid, the other end of the connecting member is sandwiched between the one end of the slide member biased by the return spring to the locking operation position and the restricting portion provided in the base member, so that the slide member and the connecting member are pushed against the restricting portion of the base member by the action of the spring force of the return spring, thereby suppressing the chattering of the slide member and the connecting member to prevent the generation of chattering sound.

The above and other objects, features and advantages of the invention will become apparent from the following description of the preferred embodiment taken in conjunction with the accompanying drawings.

DETAILED DESCRIPTION OF THE PREFERRED EMBODIMENT

Figure 1:
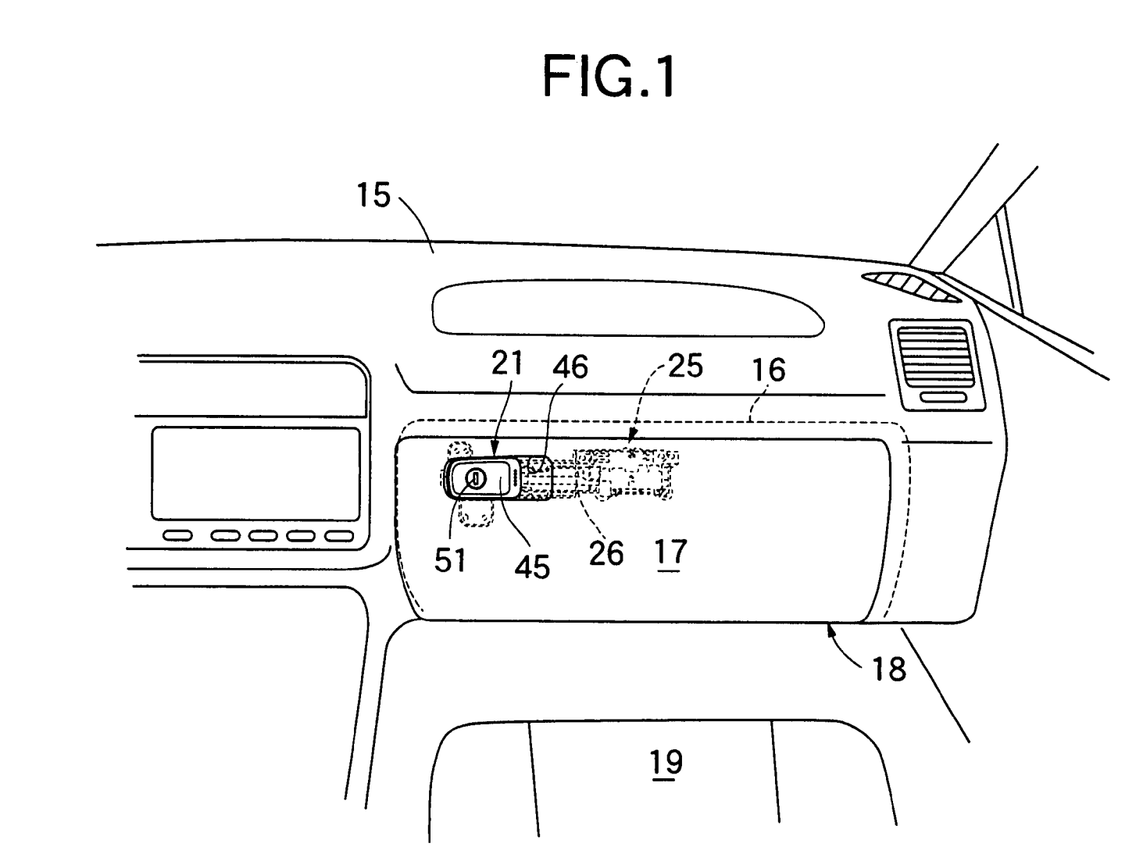
FIG. 1 is a front view of a glove box device according to an embodiment of the present invention.

Referring first to FIG. 1, a glove box 18 is mounted on an instrument panel 15 disposed in a front portion in a vehicle compartment of a passenger vehicle, for example, with a left-hand steering wheel, at position in front of an assistant driver's seat. The glove box 18 includes a box body 16 integral with the instrument panel 15, and a lid 17 capable of opening and closing an opening in the box body 16 by its vertical turning about a horizontal axis.

Figure 2:
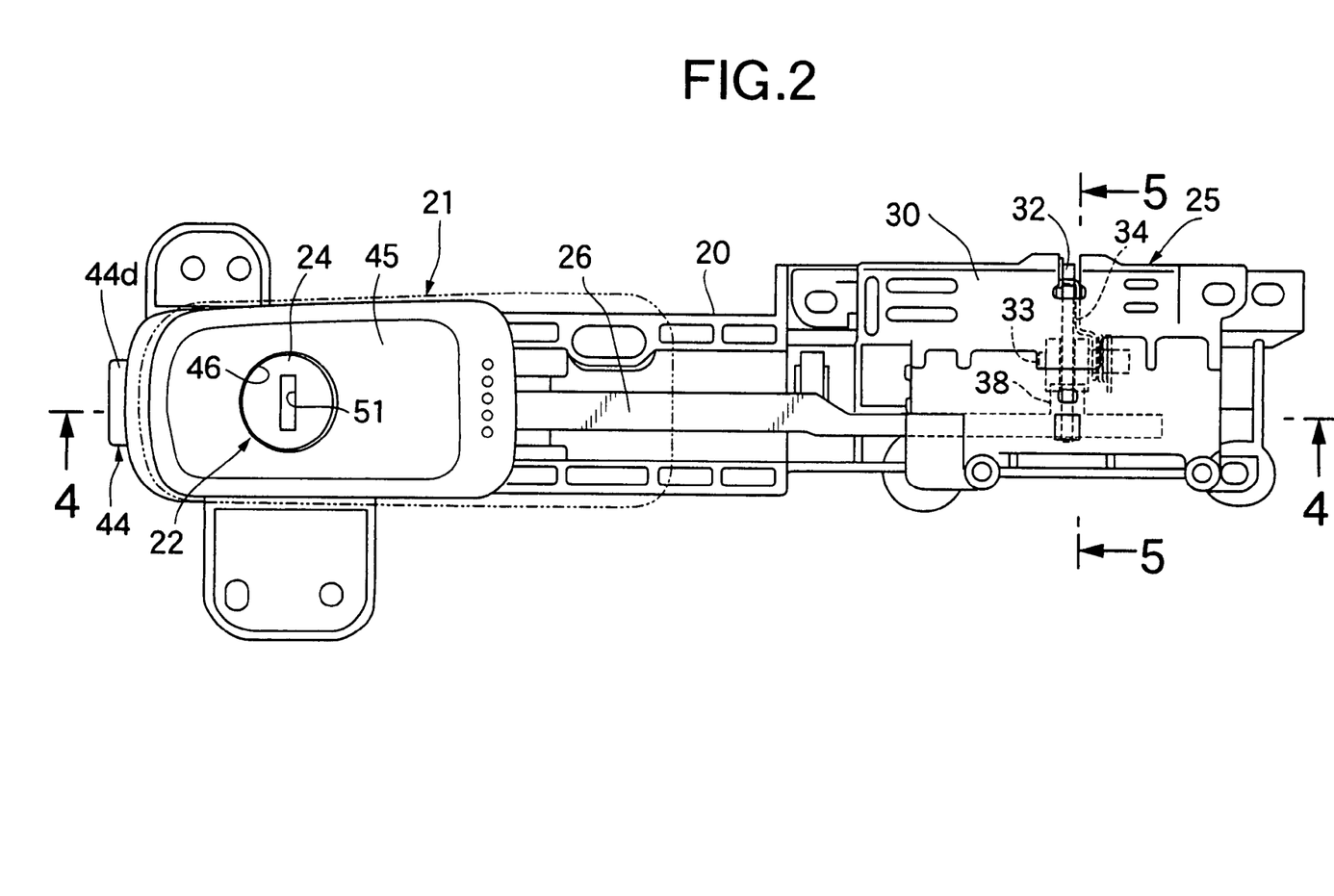
FIG. 2 is a view showing a base member, an operating handle and a locking mechanism taken from the front of a lid.
Figure 3:
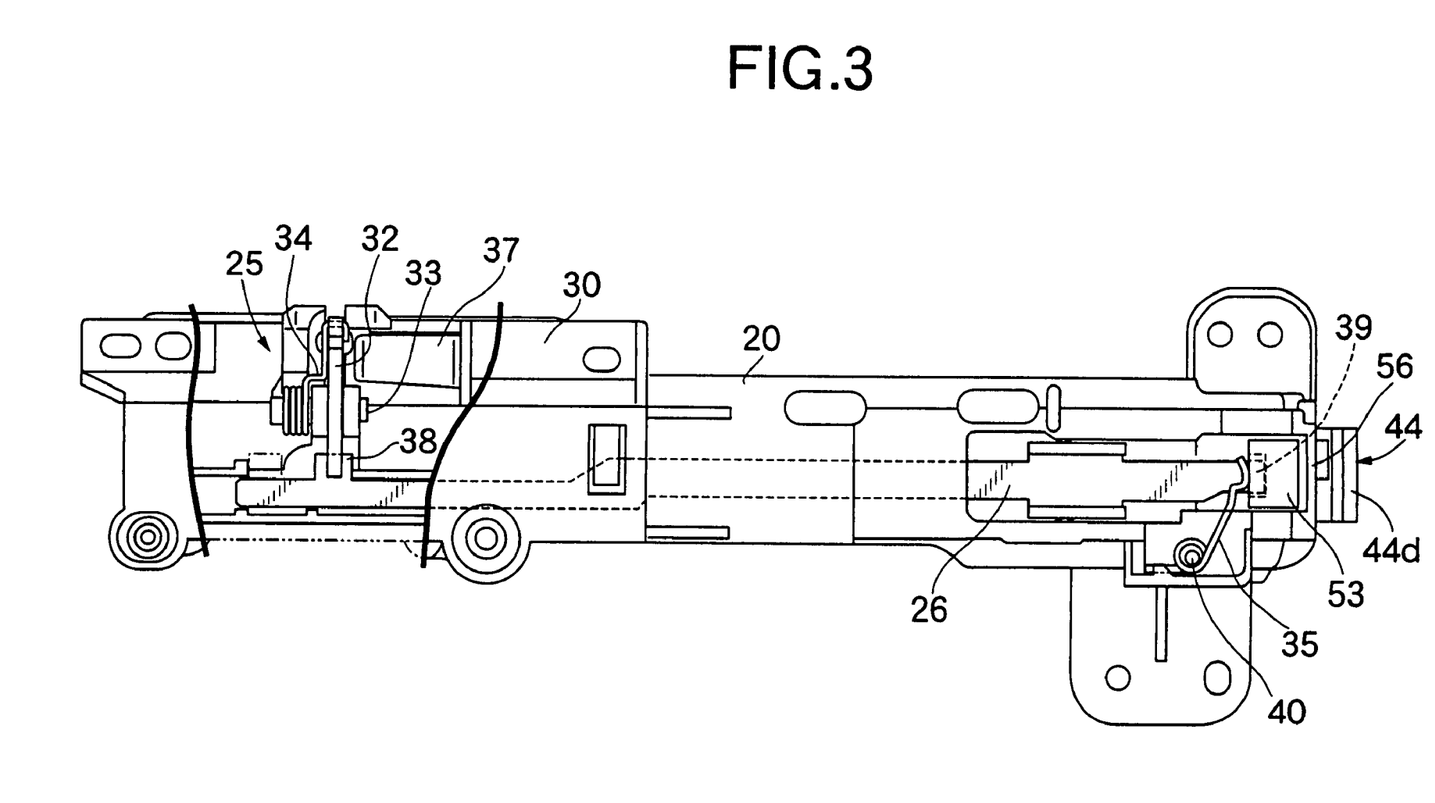
FIG. 3 is a partially cutaway view showing the base member, the operating handle and the locking mechanism taken from a side opposite from that in FIG. 2 in a state in which a slide member is in a locking operation position.
Figure 4:
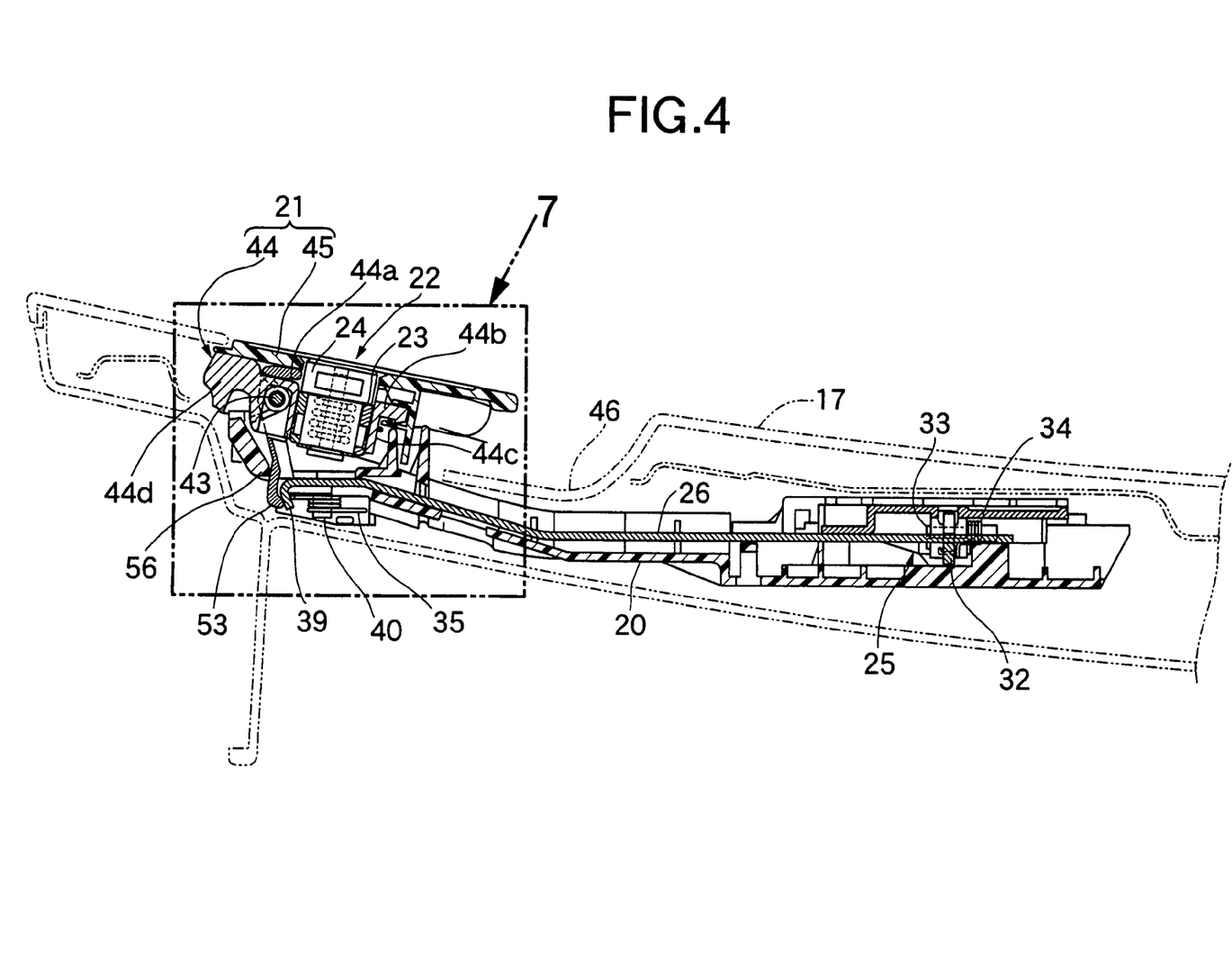
FIG. 4 is a sectional view taken along a line 4-4 in FIG. 2.

Referring to FIGS. 2 to 4 together, a base member 20 made of a synthetic resin is attached to and accommodated within the lid 17 made of a synthetic resin, so that the base member 20 extends in the left/right direction. A steering handle 21 is turnably carried at one end in the left/right direction (at a left end in this embodiment) of the base member 20. A cylinder lock 22 comprises a cylinder 23 fixed to the operating handle 21, and a rotor 24 turnably inserted into the cylinder 23 so that the rotor 24 can turn between a locking position and an unlocking position. A locking mechanism 25 is disposed in base member 20. The locking mechanism 25 has a slide member 26 capable of sliding between an locking operation position and an unlocking operation position, and switches between a locked state, in which a closed state of the lid 17 is maintained, and an unlocked state in which opening of the lid 17 is permitted, in correspondence to sliding motion of the slide member 26. A connecting member 53 is interposed between the rotor 24 and the slide member 26. The connecting member 53 transmits a turning force of the rotor 24 turning along with the operating handle 21 to the slide member 26 so as to cause the slide member 26 to slide from the locking operation position to the unlocking operation position upon turning operation of the operating handle 21 to an opening side, when the rotor 24 is in the unlocking position; but the connecting member 53 cuts off the transmission of the turning force between the slide member 26 in the locking operation position and the rotor 24, when the rotor 24 is in the locking position.

Figure 5:
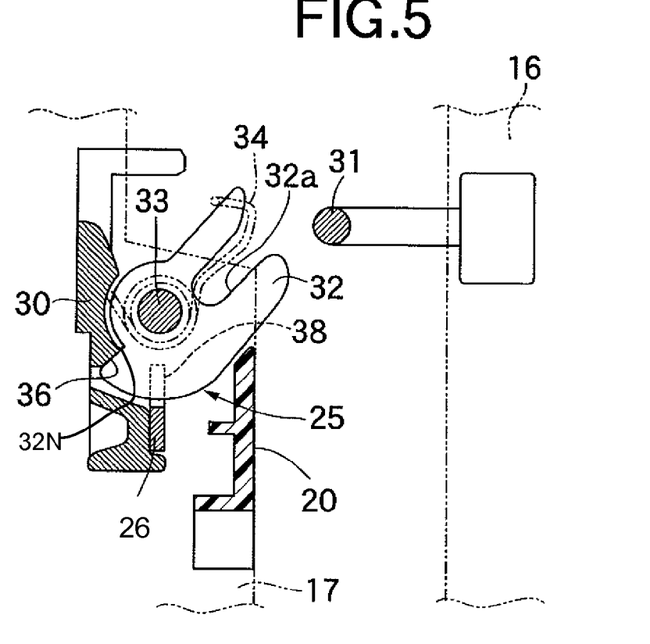
FIG. 5 is a sectional view taken along a line 5-5 in FIG. 2 in an opened state of a lid.
Figure 6:
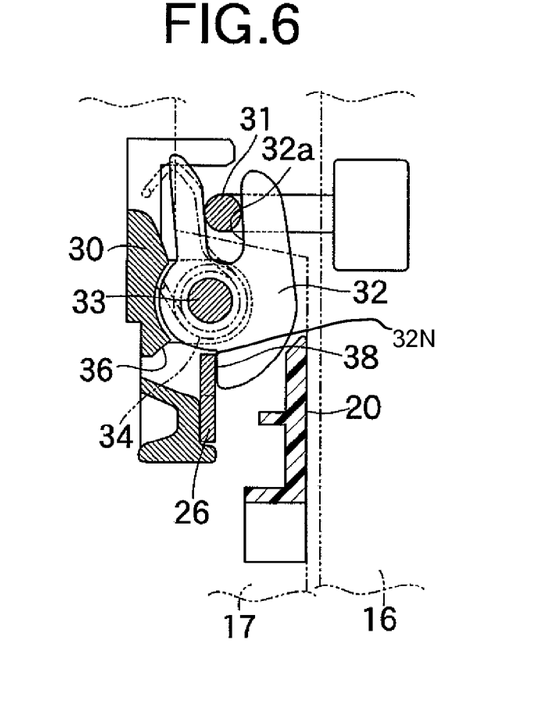
FIG. 6 is a sectional view similar to FIG. 5, but in a closed state of the lid.

Referring also to FIG. 5, the locking mechanism 25 includes: a body 30 made of a metal and fixed to the other end in the left/right direction (the right end in this embodiment) of the base member 20; a striker 31 mounted on the box body 16; and a latch 32 capable of being engaged with the striker 31. As seen in FIGS. 5-6, the latch 32 has a notch 32n formed therein to selectively receive either a turning-restricting portion 36 of the metal body 30, or a toothed projection 38 of the slide member 26. The locking mechanism 25 also includes a first support shaft 33 mounted on the body 30 to turnably carry the latch 32 so that the latch 32 is enabled to engage with the striker 31 and turn; a spring 34 mounted between the body 30 and the latch 32; the slide member 26 made of a steel plate and mounted on the body 30; and a return spring 35 mounted between the slide member 26 and the base member 20. The slide member 26 moves linearly between the locking operation position (the position shown in FIGS. 2 and 3), in which it is in engagement with the latch 32 engaged with the striker 31 to prevent the turning of the latch 32, thereby maintaining the closed state of the lid 17, and the unlocking operation position in which it is out of engagement with the latch 32 to permit the turning of the latch 32, thereby permitting the opening of the lid 17.

The latch 32 is provided with an engagement groove 32a which with the striker 31 entering the body 30. When the lid 17 is operated to the closed position in a state in which the latch 32 is in an opening position, the latch 32 is turned by the striker 31 to a closing position shown in FIG. 6, whereby the striker 31 is engaged into the engagement groove 32. In this state, the turning of the latch 32 is inhibited, whereby the lid 17 is locked in its closed state.

The spring 34 surrounding the first support shaft 33 is engaged at its opposite ends with the body 30 and the latch 32. The spring 34 exhibits a spring force for biasing the latch 32 toward the opening position shown in FIG. 5, i.e., in a clockwise direction in FIGS. 5 and 6. The body 30 is provided with a turning-restricting portion 36 capable of abutting against the latch 32 so as to define an end of turning of the latch 32 toward the opening position.

As shown in FIG. 3, a leaf spring 37 is secured to the body 30 on one side in the left/right direction of the latch 32, and adapted to abut against the striker 31 entering the body 30, so that the striker 31 is prevented from being brought into shocking contact with the body 30 by a resilient force exhibited by the leaf spring 37.

The slide member 26 extends a long distance in a direction parallel to an axis of the first support shaft 33, and is supported by the base member 20 and the body 30 fixed to the base member 20 so that the slide member 26 can slide in a lengthwise direction. An engagement projection 38 (toothed projection) is integrally provided on the slide member 26 to protrude sideways, and this projection 38 is adapted to engage with the notch 32n of the latch 32 when the latch 32 is turned to the closing position by the striker 31, thereby retaining the latch 32 in the closing position.

Thus, the slide member 26 can slide between the locking operation position at lengthwise one end in which the engagement projection 38 is in engagement with the latch 32, as shown in FIGS. 3 and 6, and the unlocking operation position at the lengthwise other end in which the engagement projection 38 is moved out of a position in which it is capable of being engaged with the latch 32, as shown by a dashed line in FIG. 3.

The slide member 26 has a spring abutment 39 provided at one end thereof. The return spring 35 which is a torsion spring surrounding a shaft 40 projectingly provided on the base member 20 has its opposite ends put into abutment against and engagement with the base member 20 and the spring abutment 39. Thus, the slide member 26 is biased toward the locking operation position by a spring force of the return spring 35.

Figure 7:
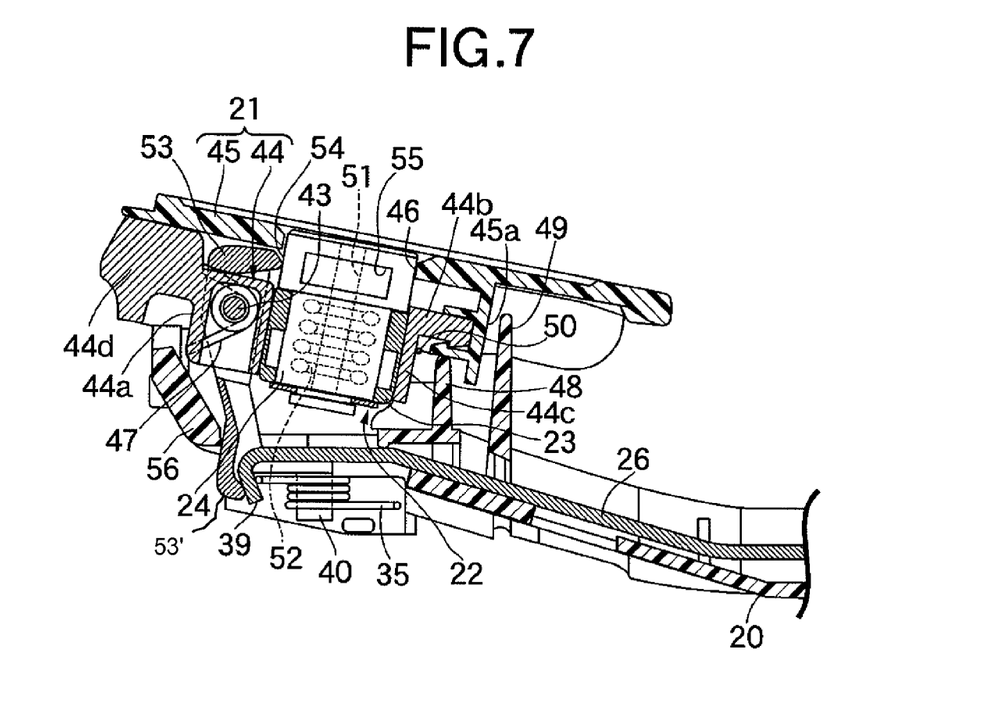
FIG. 7 is an enlarged view of a part indicated by an arrow 7 in FIG. 4 in a state in which a rotor of a cylinder lock is in a unlocking position.

Referring to FIG. 7, the operating handle 21 comprises: a handle body 44 made of a metal and turnably carried on one end in the left/right direction (on a left end in this embodiment) of the base member 20 through a second support shaft 43 which has an axis extending vertically and perpendicularly to the lengthwise direction of the slide member 26; and a design member 45 made of a synthetic resin and mounted on the handle body 44.

The lid 17 is provided with a recess 46 to which a portion of the base member 20 is opposed. The handle body 44 integrally comprises: a shaft support portion 44a supported by the second support shaft 43; a support arm 44b extended from the shaft support portion 44a and disposed within the recess 46; a mounting tube portion 44c provided at an intermediate portion of the support arm 44b so as to protrude toward the base member 20; and a counterweight portion 44d connected to the shaft support portion 44a on a side opposite from the support arm 44b so as to inhibit the turning of the operating handle 21 toward the opening position by an inertial force.

The design member 45 is fitted and mounted to the support arm 44b of the handle body 44 from a side opposite from the shaft support portion 44a. The design member 45 is provided with an engagement portion 45a resiliently engaged with a tip end of the support arm 44b, and a circular mounting bore 46 corresponding to the mounting tube portion 44c of the handle body 44.

A torsion spring 47 is mounted between the handle body 44 of the operating handle 21 and the base member 20 to surround the second support shaft 43, so that the operating handle 21 is biased to the closing position by a spring force of the torsion spring 47. A restricting rib 48 is integrally and projectingly provided on the base member 20, and adapted to abut against the support arm 44b of the handle body 44 so as to define the closing position of the operating handle 21 when the operating handle 21 is in the closing position. Further, a finger-pinching preventing rib 49 is integrally and projectingly provided on the base member 20 at a position outward of the restricting rib 48 in order to prevent an operator's finger from being pinched between the restricting rib 48 and the support arm 44b.

Thus, in mounting the design portion 45 is to the handle body 44, the engagement portion 45a provided on the design portion 45 interferes with the restricting rib 48 and the finger-pinching preventing rib 49 to make the mounting impossible, when the handle body 44 is in the closing portion. However, if the handle body 44 is turned to the opening position, the design portion 45 can be fitted and mounted to the support arm 44b of the handle body 44 from the side opposite from the shaft support portion 44a.

The cylinder 23 of the cylinder lock 22 is non-rotatably fitted from the mounting bore 46 into the mounting tube portion 44c of the handle body 44 in a state in which the design portion 45 is mounted to the handle body 44. Moreover, a substantially C-shaped resilient engagement member 50 is mounted around an outer periphery of the mounting tube portion 44c so that its opposite ends can enter the mounted tube portion 44c. The cylinder 23 is fitted in the mounting tube portion 44c to bring the opposite ends of the resilient engagement member 50 into resilient engagement with the outer periphery of the cylinder 23, thereby fixing the cylinder 23 into the mounting tube portion 44c.

The rotor 24 is turnably inserted into the cylinder 23, and also inserted into the mounting bore 46 in the design member 25 in such a manner that its front end faces an outer surface of the design member 25. The rotor 24 is capable of being turned between the unlocking position shown in FIGS. 1 and 2 and the locking position in which it is turned in the clockwise direction in FIGS. 1 and 2 by substantially 90 degree from the unlocking position, by turning a key (not shown) inserted into a keyhole 51 provided in the rotor 24. Tumblers 52 are mounted within the rotor 24 for switching the permission and inhibition of the turning of the rotor 24 between the unlocking position and the locking position by the engagement and disengagement of them with and from the cylinder 23 by the insertion of a normal key into the keyhole 51.

A portion of an outer surface of the rotor 24 is exposed between the handle body 44 and the design member 45. A connecting member 53 is interposed between the rotor 24 and the slide member 26 in such manner that its one end is opposed to the exposed outer surface of the rotor 24. As can be seen in FIGS. 4 and 7-9, connecting member 53 includes an upper portion (also called the one end herein) and a lower portion (also called the other end herein) designated as 53' in FIG. 7. The lower portion is generally L-shaped in cross section, with the bottom of the L-shape disposed between restricting portion 56 and slide member 26 (best seen in FIG. 7), the length of the L-shape extending upward to connect to a connection portion which in turn connects to the upper portion adjacent to 55, the abutment avoiding recess. The upper portion is generally oval shaped in cross section.

The connecting member 53 serves to transmit the turning force of the rotor 24 turning along with the operating handle 21 to the slide member 26 to cause the slide member 26 to slide from the locking operation position to the unlocking operation position upon the turning of the operating handle 21 to the opening position when the rotor 24 is in the unlocking position; but to cut off the transmission of the turning force between the slide member 26 in the locking operation position and the rotor 24 when the rotor 24 is in the locking position.

The connecting member 53 is supported on the base member 20 so as to turn about an axis same as that of turning of the operating handle 21, and also turnably supported on the second support shaft 43 which turnably supports the operating handle 21 on the base member 20.

A driving abutment face 54 and an abutment avoiding recess 55 are provided on the outer surface of the rotor 24 at a portion to which one end of the connecting member 52 is opposed. The driving abutment face 54 abuts against one end of the connecting member 53 when the rotor 24 is in the unlocking position. The abutment avoiding recess 55 avoids the abutment against one end of the connecting member 53 when the rotor 24 is in the locking position.

The other end of the connecting member 53 is disposed so as to face one end of the slide member 26, in such a manner that it is sandwiched between a restricting portion 56 provided on the base member 20 and the one end of the slide member 26 in a state in which the slide member 26 is in the locking operation position, as shown in FIG. 7.

Figure 8:
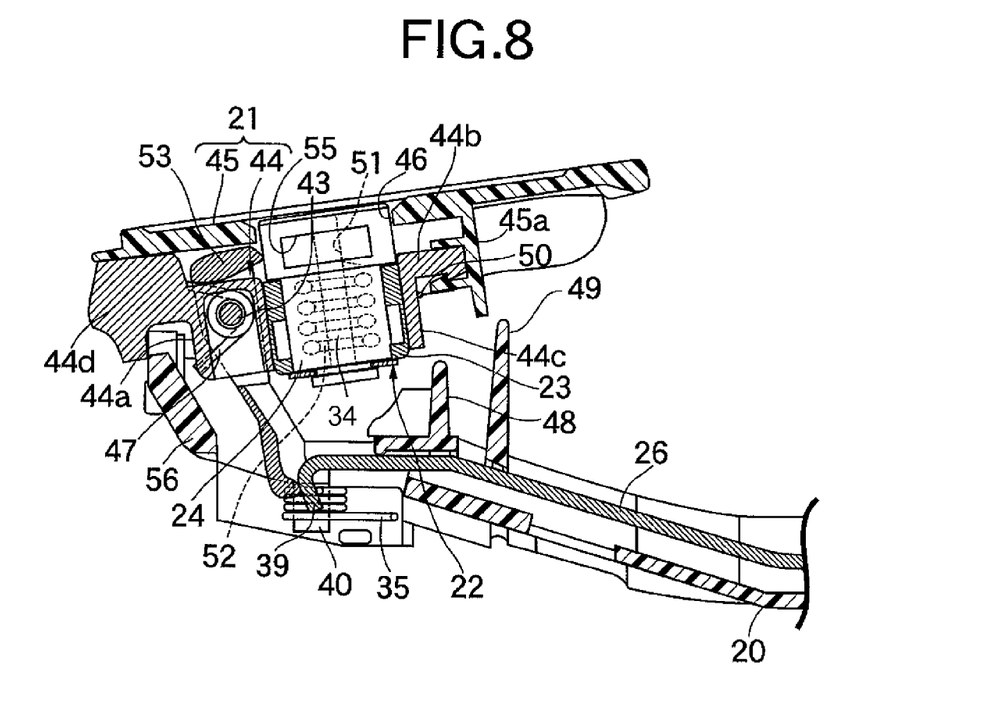
FIG. 8 is a view similar to FIG. 7, but when the operating handle is operated in the state in which the rotor of the cylinder lock is in the unlocking position.

Thus, when the slide member 26 is in the unlocking operation position, as shown in FIG. 7, the driving abutment face 54 of the rotor 24 is at a position corresponding to one end of the connecting member 53, and the one end of the connecting member 53 is in abutment against the driving abutment face 54. When the operating handle 21 is operated for opening in this state, the connecting member 53 is turned along with the rotor 24 of the cylinder lock 22, whereby a force for sliding the slide member 26 from the locking operation position to the unlocking operation position is transmitted from the connecting member 53 to the slide member 26, as shown in FIG. 8. Thus, the slide member 26 is slid so that its engagement projection 38 is moved from a position shown by a solid line in FIG. 3 to a position shown by a dashed line in FIG. 3. In this state, the latch 32 is turned in a direction to be disengaged from the striker 31 by the spring force of the spring 34, thereby bringing the locking mechanism 25 into the unlocking state.

At this time, when the operating handle 21 is returned to the closing position by the spring force of the torsions spring 47 upon release of the operator's hand from the operating handle 21, the slide member 26 attempts to return from the unlocking operation position to the locking operation position by the spring force of the return spring 35. However, the slide member 26 cannot return to the locking operation position due to the abutment of the engagement projection 38 against a side of the latch 32, because the latch 32 has been already returned to the unlocking operation position. Thus, when the latch 32 is turned by virtue of the engagement with the striker 31 by returning the lid 17 to the closed position, the slide member 26 is returned to the locking operation position in order to bring the engagement projection 38 into engagement with the latch 32 to bring the locking mechanism 25 into the locking state.

Figure 9:
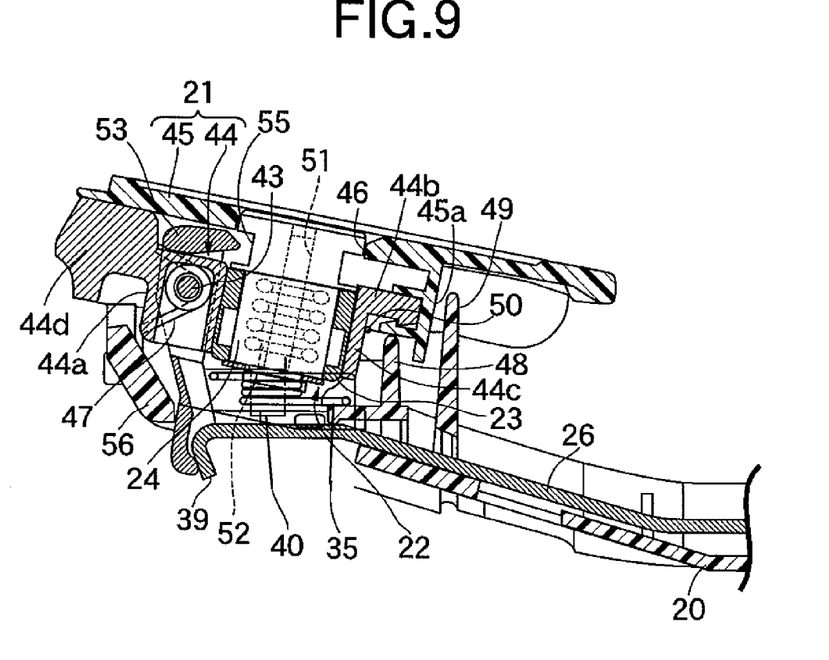
FIG. 9 is a view similar to FIG. 8, but in a non-operated state of the operating handle when the rotor of the cylinder lock is in a locking position.
Figure 10:
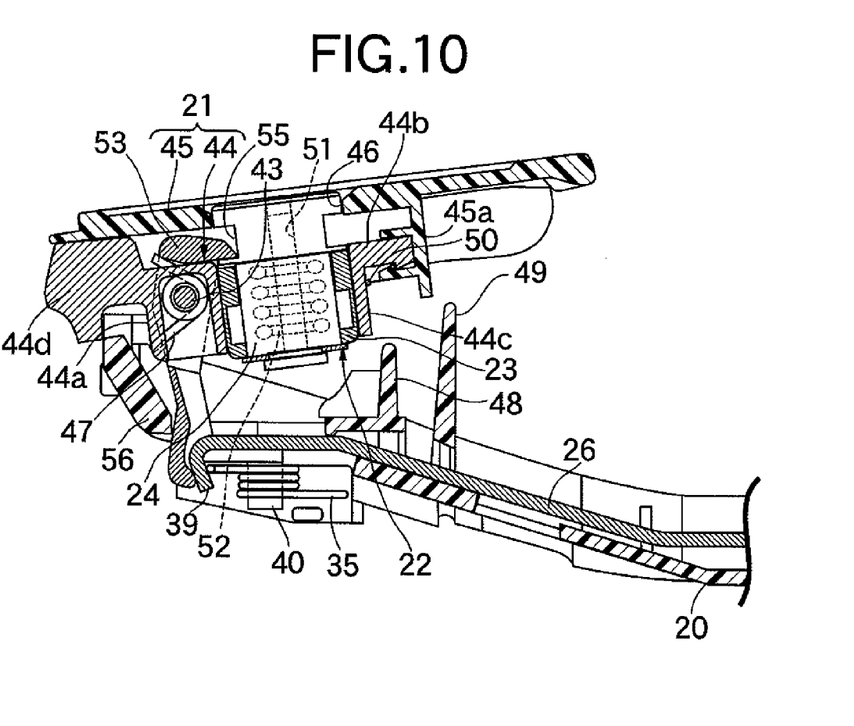
FIG. 10 is a view similar to FIG. 9, but when the operating handle is operated for opening in the state in which the rotor of the cylinder lock is in the locking position.

When the rotor 24 is in the locking position, the abutment avoiding recess 55 of the rotor 24 is at a position corresponding to one end of the connecting member 53, as shown in FIG. 9. When the operating handle 21 is operated for opening in this state, even if the rotor 24 is turned along with the operating handle 21, the one end of the connecting member 53 is merely placed further into the abutment avoiding recess 55, as shown in FIG. 10, and the connecting member 53 remains stationary in order to cut off the transmission of the turning force between the slide member 26 in the locking operation position and the rotor 24.

The operation of this embodiment will be described below. The cylinder 23 of the cylinder lock 22 is fixed to the operating handle 21, and hence it is possible to reduce the gap between the design surface of the operating handle 21 and the cylinder lock 22 to improve the appearance.

Further, the connecting member 53 is interposed between the rotor 24 and the slide member 26 so as to transmit the turning force of the rotor 24 turning along with the operating handle 21 to the slide member 26 to cause the slide member 26 to slide from the locking operation position to the unlocking operation position upon the turning of the operating handle 21 to the opening position when the rotor 24 is in the unlocking position; but to cut off the transmission of the turning force between the slide member 26 in the locking operation position and the rotor 24 when the rotor 24 is in the locking position. Therefore, when the rotor 24 of the cylinder lock 22 is in the unlocking position, the turning force of the rotor 24 of the cylinder lock 22 turning along with the operating handle 21 is transmitted through the connecting member 53 to the slide member 25 to bring the locking mechanism 25 into the unlocking state. On the other hand, when the rotor 24 is in the locking position, the turning force of the rotor 24 of the cylinder lock 22 turning along with the operating handle 21 is not transmitted through the connecting member 53 to the slide member 26. Thus, only the connecting member 53 serves as a component for transmitting the turning operation force of the operating handle 21 to the slide member 26, thereby decreasing the number of the components and simplifying the structure, leading to the cost reduction. Further, no operational delay is generated in transmitting the operational force of the operating handle 21 to the locking mechanism 25, thereby improving the operational feeling.

Furthermore, the connecting member 53 is supported on the base member 20, and interposed between the rotor 24 and the slide member 26 so that it can be turned about an axis same as that of turning of the operating handle 21. The driving abutment face 54 and the abutment avoiding recess 55 are provided on the outer surface of the rotor 24, the driving abutment face abutting against the one end of the connecting member 53 when the rotor 24 is in the unlocking position, the abutment avoiding recess 55 avoiding the abutment against the one end of the connecting member 53 when the rotor 24 is in the locking position. With this simple structure, the transmission and the cutting-off of the transmission of the turning force of the operating handle 21 to the slide member 26 is switched over in response to the unlocking and locking operations of the cylinder lock 22.

Moreover, the return spring 35 is mounted between the slide member 26 and the base member 20 so as to bias the slide member 26 toward the locking operation position located on its lengthwise one end side; and the other end of the connecting member 53 faces the one end of the slide member 26 in such a manner that it is sandwiched between the restricting portion 56 provided on the base member 20 and the one end of the slide member 26, when the slide member 26 is in the locking operation position. Therefore, in the closed state of the lid 17, the slide member 26 and the connecting member 53 are pushed against the restricting portion 56 of the base member 20 by the action of the spring force of the return spring 35, thereby suppressing the chattering of the slide member 26 and the connecting member 53 to prevent the generation of chattering sound.

Although the embodiment of the present invention has been described in detail, the present invention is not limited to the above-described embodiment, and various modifications in design may be made without departing from the subject matter of the present invention.

What is claimed is:

1. A glove box device comprising:
    a hollow box body having an opening formed therein;
    a lid pivotally attached to the box body and capable of selectively opening or closing the opening of the box body;
    a base member mounted to the lid for concurrent movement therewith;
    an operating handle pivotally supported on the base member;
    a cylinder lock including a cylinder fixed to the operating handle, and a rotor pivotally inserted into the cylinder so that the rotor can turn between a locking position and an unlocking position;
    a locking mechanism comprising a slide member capable of sliding between a locking operation position and an unlocking position, and which switches between a locked state in which a closed state of the lid is maintained and an unlocked state in which opening of the lid is permitted, in correspondence to sliding movement of the slide member, the slide member including a toothed projection;
a striker operatively attached to the box body;
a latch which is pivotally attached to the base member and capable of cooperating with the striker to temporarily maintain the lid in a closed state, the latch having a notch formed therein to receive the toothed projection of the slide member;
and a connecting member interposed between the rotor and the slide member; the connecting member configured to transmit a turning force of the rotor to the slide member to move the slide member from the locking operation position to the unlocking position upon turning operation of the operating handle to an opening side, when the rotor is in the unlocking position, the connecting member operable to cut off transmission of the turning force between the slide member in the locking operation position and the rotor, when the rotor is in the locking position;
wherein the connecting member and the slide member are pushed against a restricting portion of a base member by a return spring.

2. A glove box device comprising:
a hollow box body having an opening formed therein;
a lid pivotally attached to the box body and capable of selectively opening or closing the opening of the box body;
a base member mounted to the lid for concurrent movement therewith;
an operating handle pivotally supported on the base member;
a cylinder lock including a cylinder fixed to the operating handle, and a rotor pivotally inserted into the cylinder so that the rotor can turn between a locking position and an unlocking position;
a locking mechanism comprising a slide member capable of sliding between a locking operation position and an unlocking position, and which switches between a locked state in which a closed state of the lid is maintained and an unlocked state in which opening of the lid is permitted, in correspondence to sliding movement of the slide member, the slide member including a toothed projection;
a striker operatively attached to the box body;
a latch which is pivotally attached to the base member and capable of cooperating with the striker to temporarily maintain the lid in a closed state, the latch having a notch formed therein to receive the toothed projection of the slide member;
a connecting member interposed between the rotor and the slide member; the connecting member configured to transmit a turning force of the rotor to the slide member to move the slide member from the locking operation position to the unlocking position upon turning operation of the operating handle to an opening side, when the rotor is in the unlocking position, the connecting member operable to cut off transmission of the turning force between the slide member in the locking operation position and the rotor, when the rotor is in the locking position; and
a return spring mounted between the slide member and the base member to bias the slide member toward the locking operation position;
wherein the connecting member is pivotally supported on the base member with a first end of the connecting member facing an outer surface of the rotor, and a second end of the connecting member facing one end of the slide member in such a manner that the connecting member is sandwiched between a restricting portion provided on the base member and one end of the slide member when the slide member is in the locking operation position;
wherein a driving abutment face and an abutment avoiding recess are provided on an outer surface of the rotor, the driving abutment face abutting against the first end of the connecting member when the rotor is in the unlocking position, and the abutment avoiding recess designed to avoid abutment against the first end of the connecting member when the rotor is in the locking position;
and wherein the connecting member comprises an inner end, and an outer end with a laterally extending projection.

3. The glove box device according to claim 2, wherein the laterally extending projection is operable to selectively contact said driving abutment face in when the rotor is in the unlocking position or to fit into said abutment avoiding recess when the rotor is in the locking position.

4. The glove box device according to claim 3, wherein said connecting member is substantially L-shaped in cross section.

5. A glove box device comprising:
a hollow box body having an opening formed therein;
a lid pivotally attached to the box body and capable of selectively opening or closing the opening of the box body;
a base member mounted to the lid for concurrent movement therewith;
an operating handle pivotally supported on the base member so as to be movable about an axis;
a cylinder lock including a cylinder fixed to the operating handle, and a rotor pivotally inserted into the cylinder so that the rotor can turn between a locking position and an unlocking position;
a locking mechanism comprising a slide member capable of sliding between a locking operation position and an unlocking position, and which switches between a locked state in which a closed state of the lid is maintained and an unlocked state in which opening of the lid is permitted, in correspondence to sliding movement of the slide member, the slide member including a toothed projection;
a striker operatively attached to the box body;
a latch which is pivotally attached to the base member and capable of cooperating with the striker to temporarily maintain the lid in a closed state, the latch having a notch formed therein to receive the toothed projection of the slide member;
and a connecting member interposed between the rotor and the slide member; the connecting member configured to transmit a turning force of the rotor to the slide member to move the slide member from the locking operation position to the unlocking position upon turning operation of the operating handle to an opening side, when the rotor is in the unlocking position;
the connecting member operable to cut off transmission of the turning force between the slide member in the locking operation position and the rotor, when the rotor is in the locking position;
wherein the connecting member is supported on the base member such that the connecting member is pivotally movable about the same axis as that of the operating handle.

* * * * *